US006535518B1

(12) United States Patent
Hu et al.

(10) Patent No.: US 6,535,518 B1
(45) Date of Patent: Mar. 18, 2003

(54) SYSTEM FOR BYPASSING A SERVER TO ACHIEVE HIGHER THROUGHPUT BETWEEN DATA NETWORK AND DATA STORAGE SYSTEM

(75) Inventors: Lee Chuan Hu, Yorda Linda, CA (US); Jordi Ros, Newport Beach, CA (US); Calvin Shen, Irvine, CA (US); Roger Thorpe, Irvine, CA (US); Wei Kang Tsai, Irvine, CA (US)

(73) Assignee: SimpleTech Inc., Santa Ana, CA (US)

( * ) Notice: Subject to any disclaimer, the term of this patent is extended or adjusted under 35 U.S.C. 154(b) by 0 days.

(21) Appl. No.: 09/631,849

(22) Filed: Aug. 3, 2000

Related U.S. Application Data

(63) Continuation-in-part of application No. 09/501,189, filed on Feb. 10, 2000.

(51) Int. Cl.[7] .................................................. H04J 3/02
(52) U.S. Cl. ..................... 370/401; 709/203; 709/219; 709/235; 370/230; 370/235
(58) Field of Search ................................ 370/229, 230, 370/231, 235, 236, 237, 238, 389, 394, 395, 396, 397, 401, 402, 403, 395.2, 395.3, 395.6, 395.7; 709/202, 203, 217, 219, 228, 235, 250

(56) References Cited

U.S. PATENT DOCUMENTS

| 4,004,277 A | 1/1977 | Gavril |
| 4,246,637 A | 1/1981 | Brown et al. |

(List continued on next page.)

FOREIGN PATENT DOCUMENTS

| WO | WO 99/46671 | 9/1999 | ............. G06F/3/06 |

OTHER PUBLICATIONS

International Search Report for International Application No. PCT/US01/00688.

International Preliminary Examination Report for International Application No. PCT/US01/00688.

Primary Examiner—Dang Ton
Assistant Examiner—Shick Hom
(74) Attorney, Agent, or Firm—Knobbe, Martens, Olson & Bear, LLP

(57) ABSTRACT

A networked system is described in which the majority of data bypass the server(s). This design improves the end-to-end performance of network access by achieving higher throughput between the network and storage system, improving reliability of the system, yet retaining the security, flexibility, and services that a server-based system provides. The apparatus that provides this improvement consists of a network interface, server computer interface, and storage interface. It also has a switching element and a high-layer protocol decoding and control unit. Incoming traffic (either from the network or storage system) is decoded and compared against a routing table. If there is a matching entry, it will be routed, according to the information to the network, the storage interface, or sent to the server for further processing (default). The routing table entries are set up by the server based on the nature of the applications when an application or user request initially comes in. Subsequently, barring any changes or errors, there will be no data exchange between the server and the device (although, a control message may still flow between them). There may also be a speed matching function between the network and storage, load balancing function for servers, and flow control for priority and QoS purposes. Because the majority of data traffic will bypass the bus and the operating system (OS) of the server(s), the reliability and throughput can also be significantly improved. Therefore, for a given capacity of a server, much more data traffic can be handled. Certain improvements concerning one particular,embodiment of the invention are also disclosed.

9 Claims, 14 Drawing Sheets

Block Function Diagram

U.S. PATENT DOCUMENTS

| | | | |
|---|---|---|---|
| 4,503,497 A | | 3/1985 | Krygowski et al. |
| 4,682,304 A | | 7/1987 | Tierney |
| 4,688,166 A | | 8/1987 | Schneider |
| 5,131,081 A | | 7/1992 | MacKenna et al. |
| 5,163,131 A | | 11/1992 | Row et al. |
| 5,404,527 A | | 4/1995 | Irwin et al. |
| 5,408,465 A | * | 4/1995 | Gusella et al. .............. 370/389 |
| 5,630,067 A | | 5/1997 | Kindell et al. |
| 5,715,453 A | | 2/1998 | Stewart |
| 5,737,549 A | * | 4/1998 | Hersch et al. .............. 370/389 |
| 5,742,759 A | * | 4/1998 | Nessett et al. ......... 395/187.01 |
| 5,802,366 A | | 9/1998 | Row et al. |
| 5,867,733 A | | 2/1999 | Meyer |
| 5,892,913 A | | 4/1999 | Adiga et al. |
| 5,913,028 A | | 6/1999 | Wang et al. |
| 5,931,918 A | | 8/1999 | Row et al. |
| 5,941,969 A | | 8/1999 | Ram et al. |
| 5,950,203 A | | 9/1999 | Stakius et al. |
| 6,014,692 A | | 1/2000 | Kelley et al. |
| 6,055,577 A | | 4/2000 | Lee et al. |
| 6,069,895 A | * | 5/2000 | Ayandeh ..................... 370/389 |
| 6,081,883 A | | 6/2000 | Popelka et al. |
| 6,097,955 A | | 8/2000 | Bhat |
| 6,195,703 B1 | | 2/2001 | Blumenau et al. |
| 6,226,680 B1 | | 5/2001 | Boucher et al. ............ 709/230 |
| 6,226,684 B1 | | 5/2001 | Sung et al. |
| 6,243,737 B1 | | 6/2001 | Flanagan et al. |
| 6,249,294 B1 | | 6/2001 | Lefebvre et al. |
| 6,253,271 B1 | | 6/2001 | Ram et al. |
| 6,260,040 B1 | | 7/2001 | Kauffman et al. |
| 6,269,410 B1 | | 7/2001 | Spasojevic |
| 6,324,581 B1 | | 11/2001 | Xu et al. |
| 6,389,479 B1 | | 5/2002 | Boucher et al. ............ 709/243 |
| 6,427,173 B1 | | 7/2002 | Boucher et al. ............ 709/238 |
| 6,434,620 B1 | | 8/2002 | Boucher et al. ............ 709/230 |
| 2001/0016878 A1 | | 8/2001 | Yamanaka |
| 2001/0039586 A1 | | 11/2001 | Primak et al. |
| 2002/0087732 A1 | | 7/2002 | Boucher et al. ............ 709/250 |
| 2002/0107989 A1 | | 8/2002 | Johnson et al. ............ 709/250 |

* cited by examiner

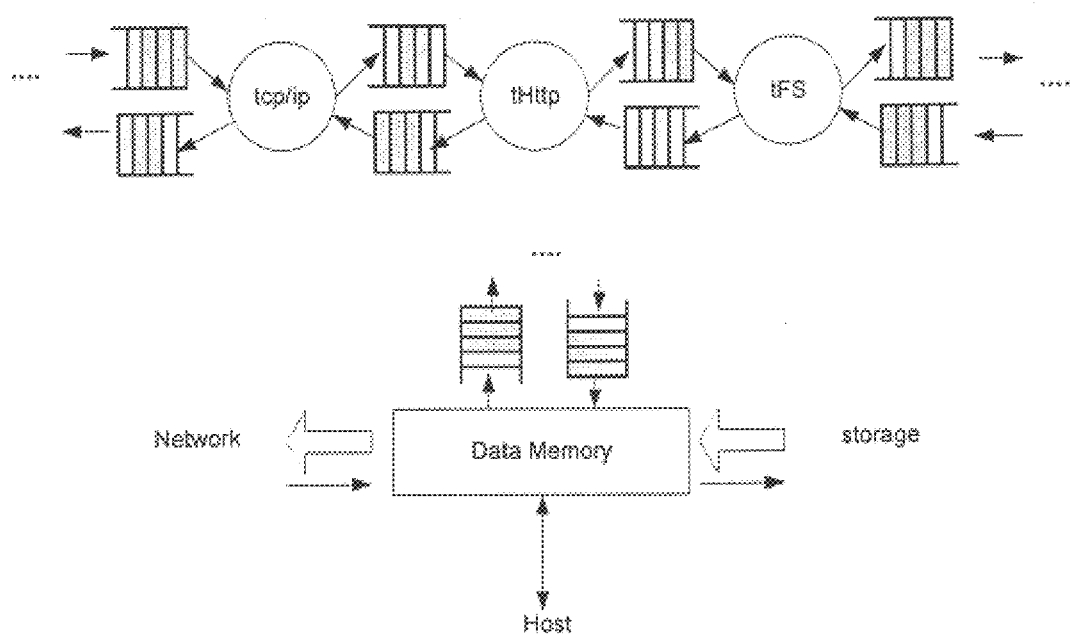
Figure 1 - A Top-Level Logical Diagram for the Data-Driven Multi-Processor Pipelined Model

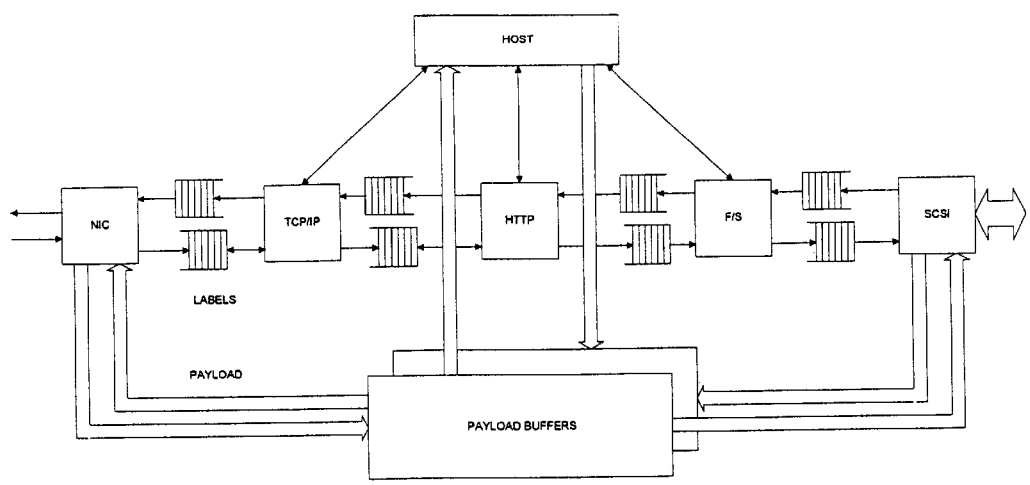
Figure 2 - A Top-Level Hardware Diagram for the Data-Driven Multi-Processor Pipelined Model

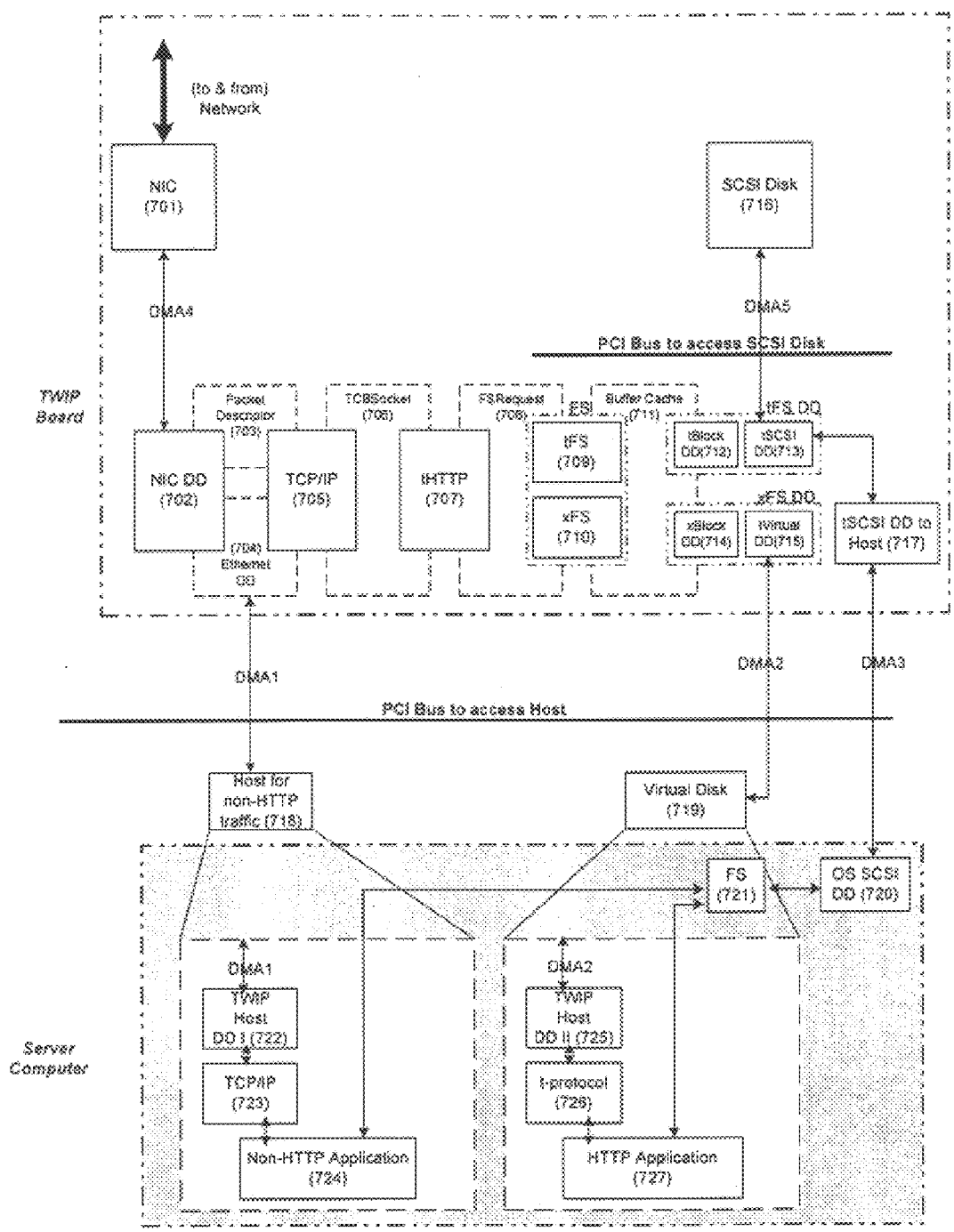
Figure 3 – Software Structure for the Preferred Embodiment for the Data-Driven Multi-Processor Pipelined Model

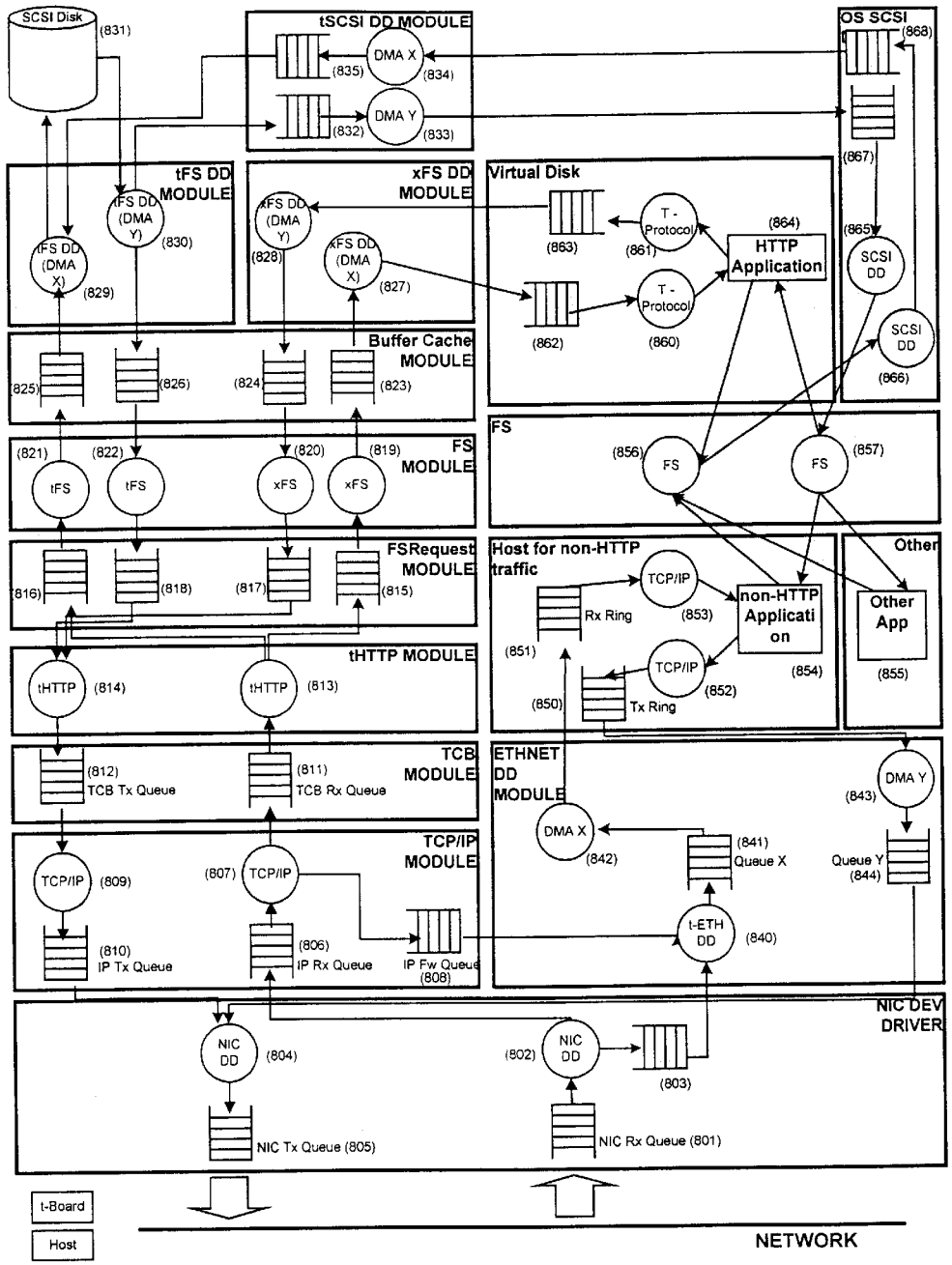
Figure 4 - The Data Queues and Processes in the Preferred Embodiment of the Data-Driven Multi-Processor Pipelined Model.

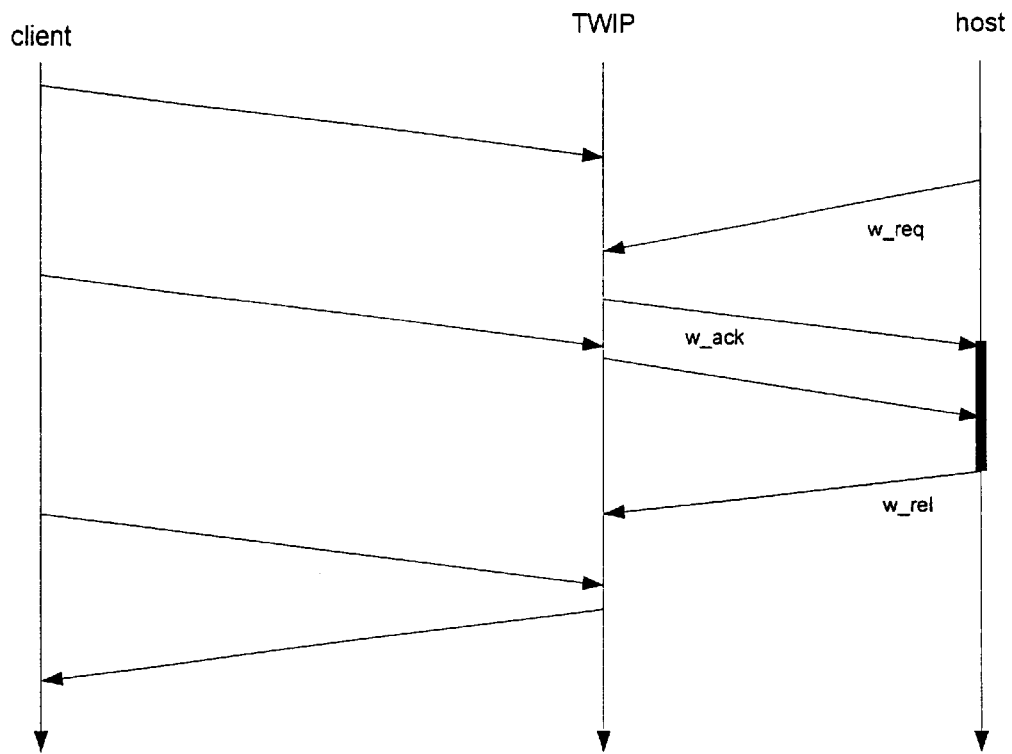
Figure 5 - The Traffic Detour To Host For Method 2 For File System Consistency Between the Bypass Board and the Host.

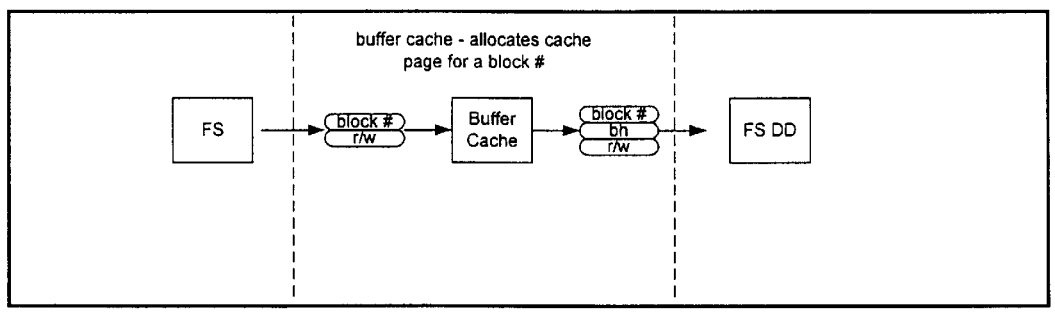
Figure 6 – Buffer Cache relation with File System and FS Device Driver

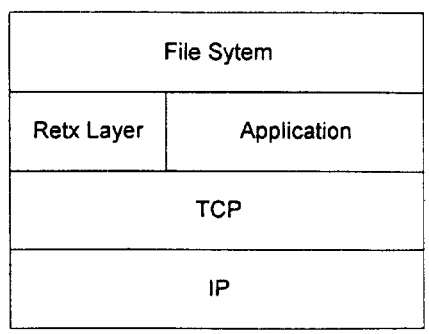
Figure 7 - TCP Retransmission Stack

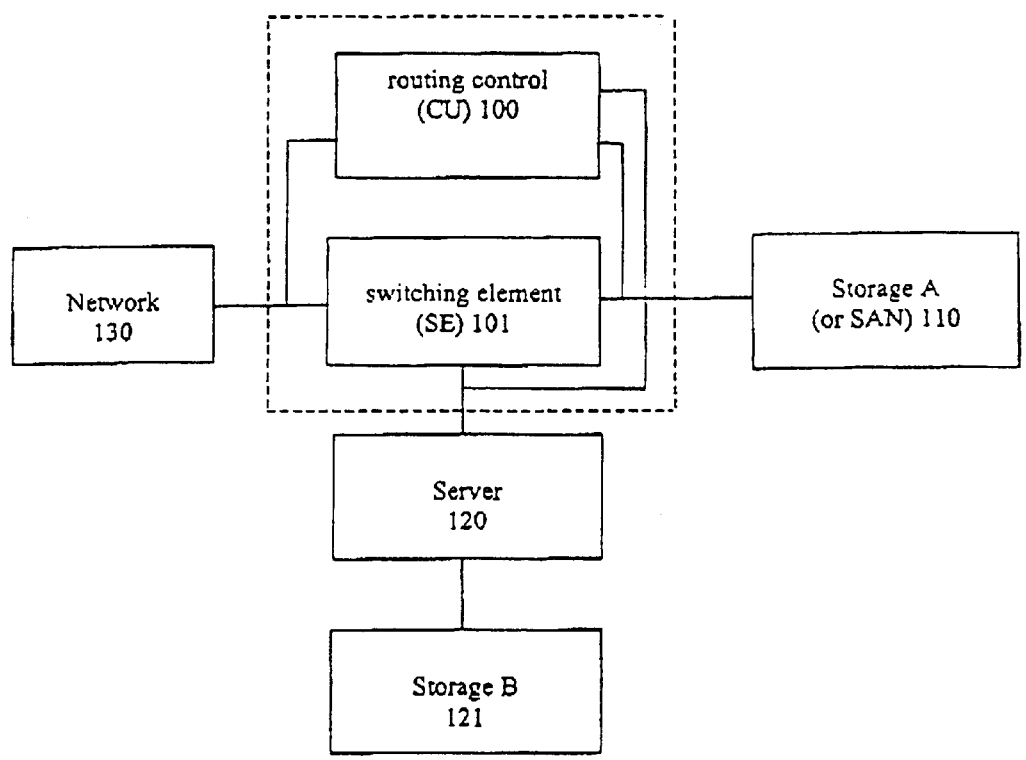
Figure 8   Top Level Function Diagram

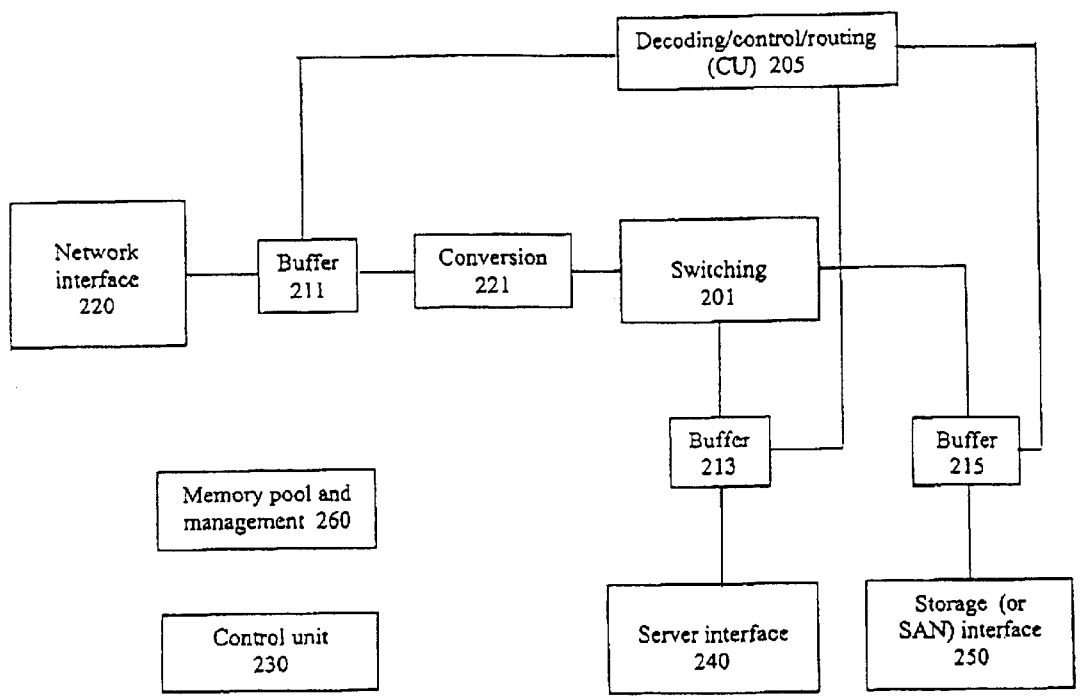
Figure 9   Block Function Diagram

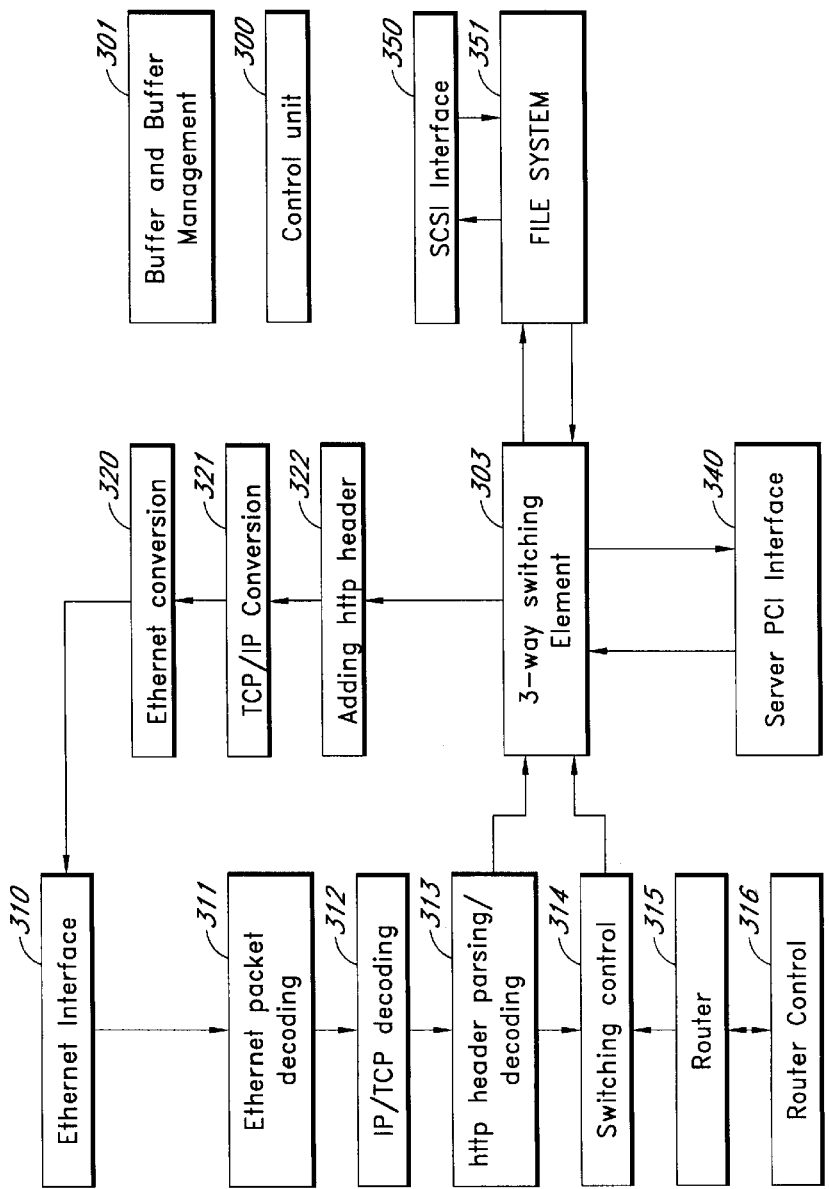
FIG. 10 An Example of Ethernet, SCSI and PCI Interfaces for http Applications

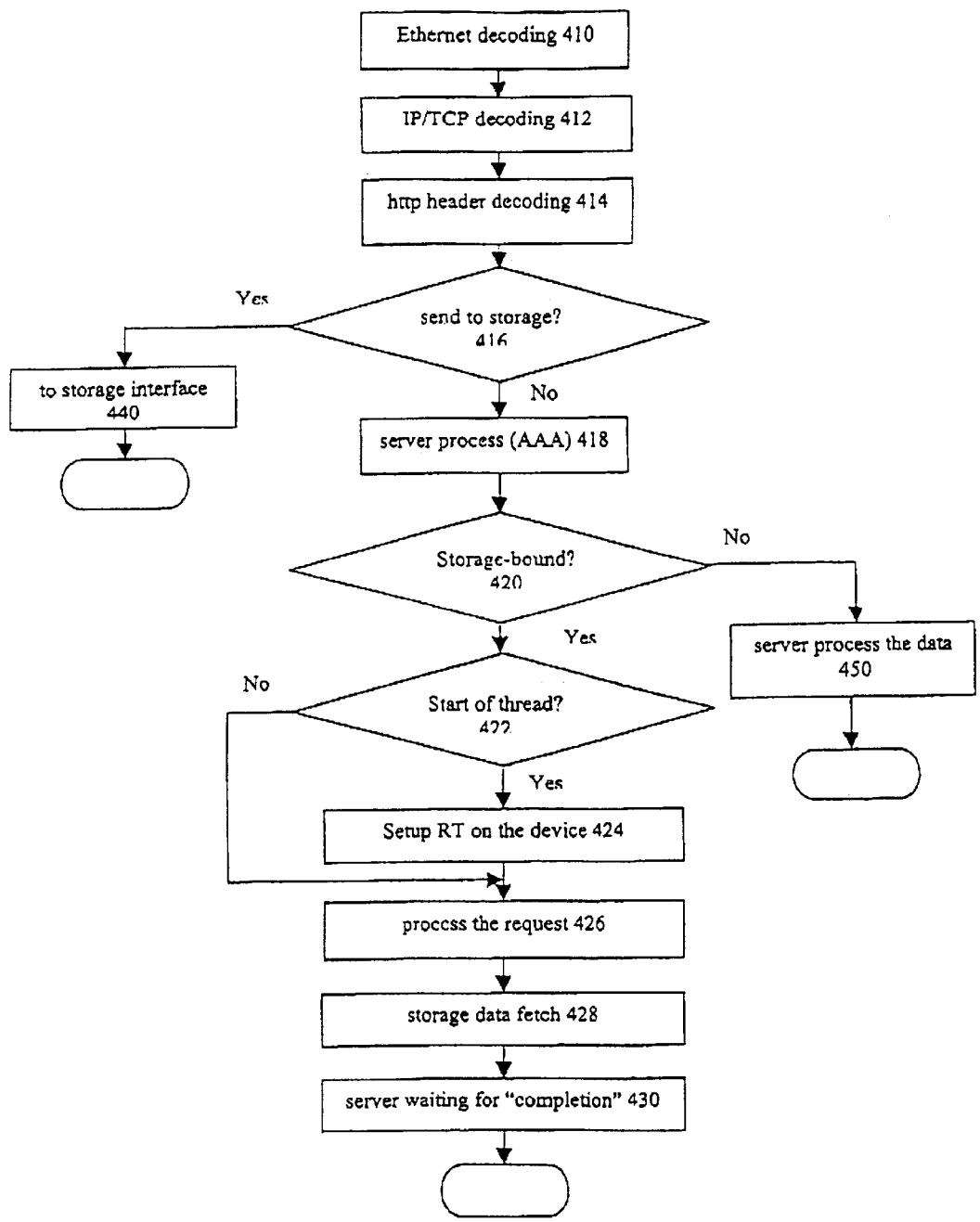
Figure 11 Traffic Flow from Network to Storage and Server

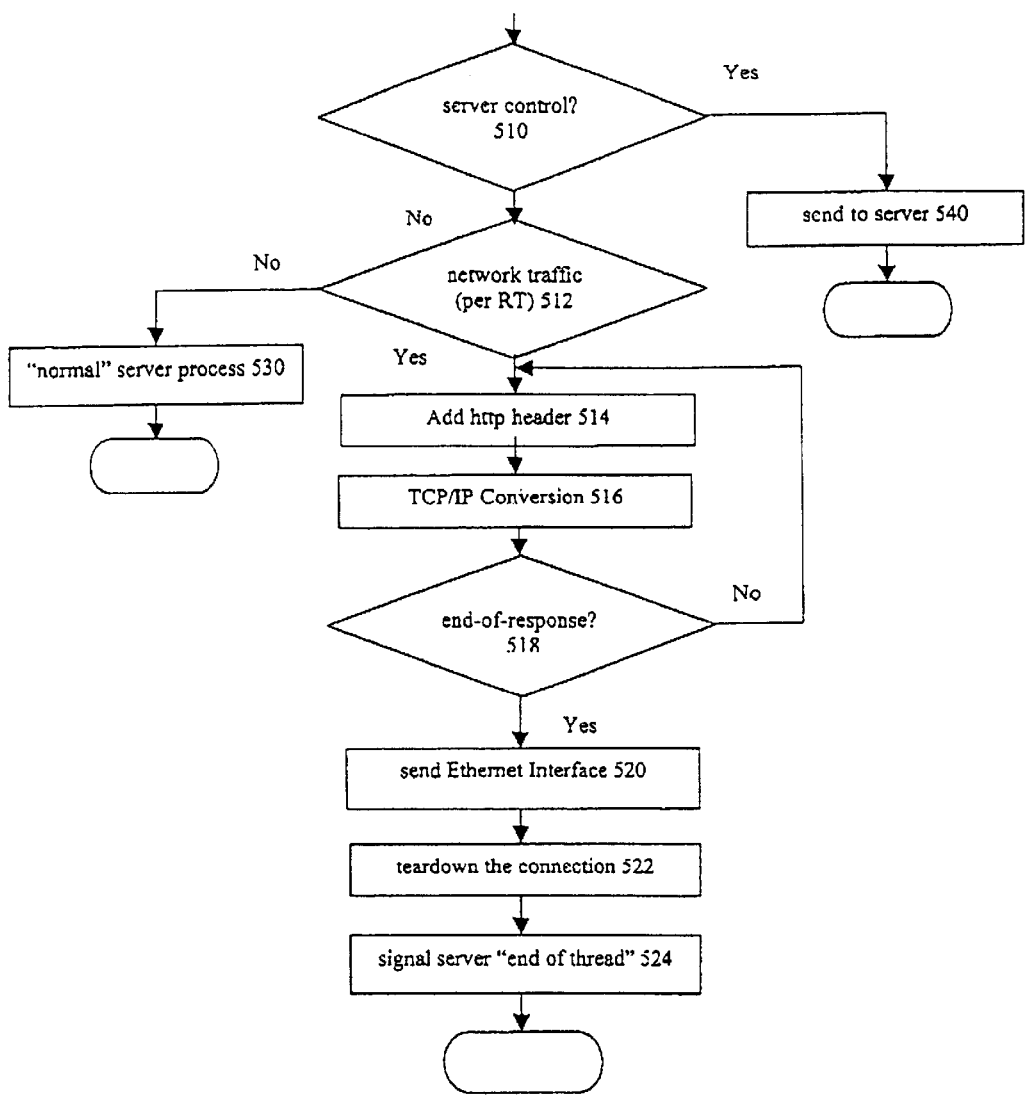
Figure 12 Traffic Flow from Storage to Network and Server

| Enet hdr | ... | IP hdr | ... | TCP hdr | ... | http hdr | ... | html payload |

Figure 13  Information Interested in a Packet

Expanded Routing Table (ERT)

| SrcID | DestID | SessionID | Outgoing PortID | Priority | Type | segment size (x base) |
|---|---|---|---|---|---|---|
| A | B | N1 | 2 | 1 | Real-time | 2 |
| A1 | B | N2 | 1 | 1 | Non-real-time | 3 |
| A2 | S | N3 | 3 | 2 | local | 1 |

Figure 14  Example of Expanded Routing Table

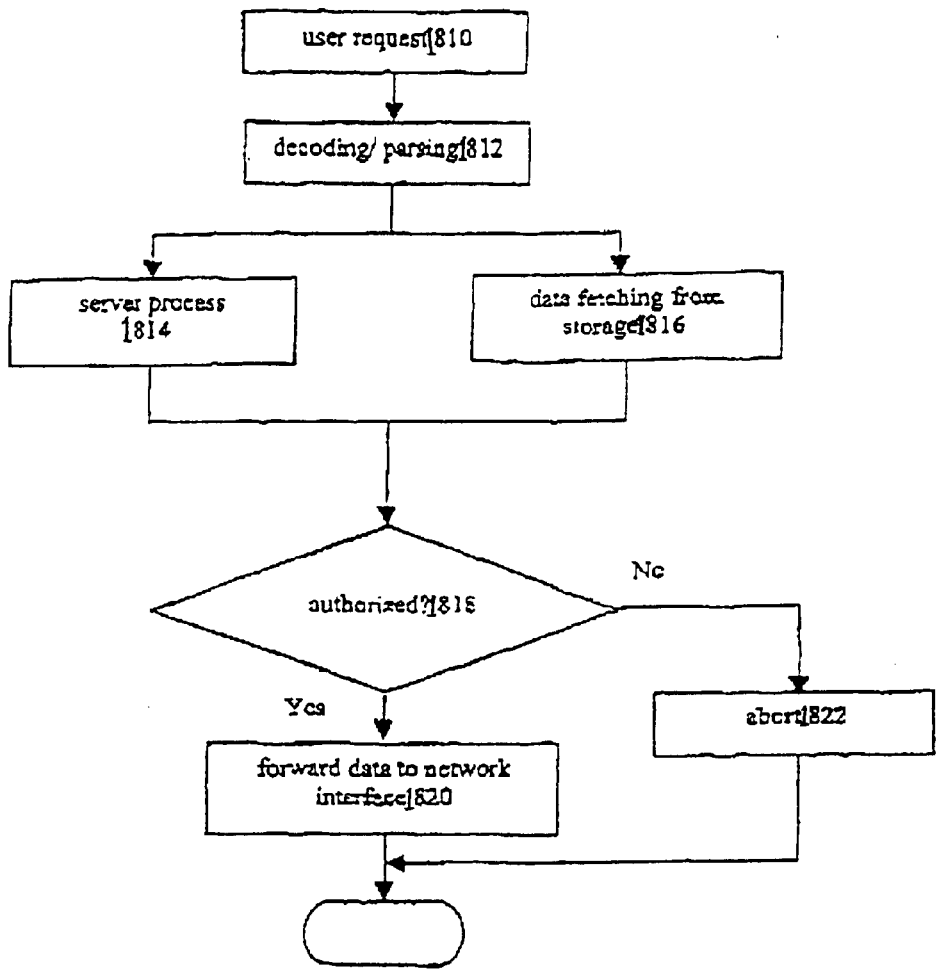
Figure 15: An Example of Concurrently Pipelined Network User Request for Web Access

SYSTEM FOR BYPASSING A SERVER TO ACHIEVE HIGHER THROUGHPUT BETWEEN DATA NETWORK AND DATA STORAGE SYSTEM

This application is a continuation-in-part of patent application Ser. No. 09/501,189, filed Feb. 10, 2000.

BACKGROUND OF THE INVENTION

1. Field of the Invention

The present invention relates to computer networks, client/server based computing, and data storage (or storage network). More particularly, this invention relates to network management, performance enhancement and reliability improvement for network data access through servers.

2. Prior Art

The following definitions will be useful in discussing the prior art in this field, and how the present invention overcomes the limitations of the prior art:

"Server": a computer system that controls data access and data flow to serve the requests from a user computer (client) connected through network(s).

"Server-oriented": Refers to data that requires significant computation or processing, that usually is carried out by a server CPU. The examples are network user login processes going through authorization, authentication and accounting (MA).

"Storage-oriented": Simple storage access such as disk read and/or write is considered storage-oriented. Most operations are data fetching and transport without the involvement of CPU. JPEG and MPEG file transport are examples of storage-oriented data.

In the current server-based Internet infrastructure, for an end user to access data from a remote web site, the following sequence of events will occur: First, the request packets from the user computer have to travel to a remote network access point via a wide area network (WAN), through the network gateway at the remote web system, and then to a server in the web system. Second, the server processes the request and sends a command to a storage device to fetch the requested data, the data travels from the device back to the server, and traverses a path back to the user computer. In this end-to-end set-up, a server is situated between the data sources and the user and is often the limiting element of the entire data access operation. Such a configuration may cause server(s) to become a major bottleneck between the clients (or network end users) and their requested data on storage devices. Both data and control traffic must pass through the server(s) twice.

Most current network systems are constructed with this architecture. Although a server system here can be a server clustering or load-balanced server farm, the fundamental problems in the content delivery through server(s) do not change. The main advantages of current systems are their flexibility and security. The server system has control over all the traffic flows. However, this architecture also comes with a number of disadvantages: server bus contention (in many cases, a PCI bus), server OS inefficiency in high-speed context switching (e.g., costly interrupt handling), and multiple data copying.

Server system bus contention causes two problems for networks. Since each peripheral component must contend for the bus usage without any guarantee of bandwidth latency and time of usage, the user data throughput varies, and the latency for data transfer cannot be bounded.

The server OS inefficiency puts a heavy toll on the network throughput. In particular, an interrupt causes two context switching operations on a server. Context switching is an OS process in which the operating system suspends its current activity, saves the information required to resume the activity later and shifts to execute a new process. Once the new process is completed or suspended, a second context switching occurs during which the OS recovers its previous state and resumes processing. Each context switch represents an undesirable loss of effective CPU utilization for the task and network throughput. For example, a server handles thousands of requests and data switches at high speed. Further, heavy loading and extensive context-switching can cause a server to crash. A small loss of data can cause TCP to retransmit, and retransmissions will cause more interrupts which in turn may cause more OS crashes. The OS interrupt-induced stability problem is very acute in a web hosting system where millions of hits can be received within a short period of time.

Multiple data copying is a problem (also known as "double copy") for normal server operations. According to the current architecture, data received from the storage (or network) have to be copied to the host memory before they are forwarded to the network (or storage). Depending on the design of the storage/network interface and the OS, data could be copied more than two times between their reception and departure at the server, despite the fact that the server CPU does not perform many meaningful functions other than verifying data integrity. Multiple data-copying problem represents a very wasteful usage of the CPU resources. When this is coupled with the OS inefficiency, it also represents a significant degradation of QoS (Quality of Service) for the data transfer.

The current solutions to server bottlenecks have involved two different approaches: improving the network performance and improving the storage performance.

An NAS is a specialized server for storage file services. The specialized server is connected to a network. The major disadvantages are the lack of the flexibility that general servers have and its need to communicate with other servers. An NAS can be used in secured environments like an internal LAN or SAN. Authorization, account, and authentication (AAA) and firewall are unlikely to be performed by an NAS, since an overly complicated function is not easily implemented in such a system. Furthermore, it is not easy to upgrade software or protocols under the specialized design of NAS.

An NAS is a storage device with an added thin network layer so the storage can be connected to a network directly. It bypasses servers, so server bottlenecks may be non-existent for NAS systems. (We do not consider a storage-dedicated server as NAS.) The major disadvantages are the lack of the flexibility that servers have, (and the overhead associated with the network layer(s) (if it is too thick)). An NAS can be used in secured environments like an internal LAN or SAN. Authorization, account, and authentication (AAA) and firewall are unlikely to be performed by an NAS, since an overly complicated function may not be implemented due to the cost. Furthermore, it is not easy to upgrade software or protocols under the limited design of interfaces for NAS.

SAN is an architecture for storage systems with the advantages of flexibility and scalability. While NAS is limited due to its network interface, SAN defines an environment dedicated to storage without worrying about security or other heterogeneous design concerns. Servers (which are more versatile) are still needed to connect the SAN to an oustide network. Therefore, the server bottleneck is still present. Furthermore, access control and other server functions are not specified in SAN systems, so other components must be added for full functionality.

From the network approach, two techniques have been devised: Web Switching and Intelligent Network Interface. Among the goals of web switching is load balancing servers in a web hosting system. While web switching has many platforms, the basic approach is to capture the IP packets and use the information they contain in the layers 4 through 7 to switch the traffic to the most suitable servers, thus keeping the servers with balanced load. This approach does not address the problems of multiple data copying and server system bus contention. The server OS inefficiency problem is only indirectly addressed.

In the Intelligent Network Interface approach, functionalities are added to the NIC (Network Interface Card) that reduce server interrupts by batch processing. This approach does not address the Server system bus contention problem directly, and as a result, the latency of data transfer is still unbounded and data transfer throughput is still not guaranteed. In addition, this approach only reduces switching overhead but does not address the multiple data-copying problem.

BRIEF SUMMARY OF THE INVENTION

Objects of the invention include the following:

1. To increase the network and storage access performance and throughput.
2. To reduce traffic delay and loss between network(s) and storage due to server congestion or to bound the latency for real-time streamings (QoS improvement).
3. To increase server and network system, availability, reliability and reduce server system failures by reducing the traffic going through the server bus, OS and CPU.
4. To maintain the flexibility of a server-based system (vs. a network attached storage or NAS).
5. To be scalable and reduce the total system-cost.

In sum, the invention aims to provide highest levels of server-based Reliability, Availability and Scalability (RAS) for a network system and highest levels of QoS for the end users.

These and other objects of the invention are achieved in the following solution strategies:

1. Throughput improvement by the data-driven multi-processor pipelined model.
2. File system consistency between the bypass board and the host.
3. HTTP synchronization between the bypass board and the host.
4. Caching on the bypass board.
5. Storage-based TCP retransmission on the bypass board.

In a networked system, an apparatus is introduced that causes the majority of data to bypass the server(s). This design improves the end-to-end performance of network access by achieving higher throughput between the network and storage system, improving reliability of the system, yet retaining the security, flexibility, and services that a server-based system provides. The apparatus that provides this improvement logically consists of a network interface, server computer interface, and storage interface. It also has a switching element and a high-layer-protocol decoding and control unit. Incoming traffic (either from the network or storage system) is decoded and compared against a routing table. If there is a matching entry, it will be routed, according to the information, to the network, the storage interface, or sent to the server for further processing (default). The routing table entries are set up by the server based on the nature of the applications when an application or user request initially comes in. Subsequently, barring any changes or errors, there will be no data exchange between the server and the device (although, a control message may still flow between them). There may also be a speed matching function between the network and storage, load balancing functions for servers, and flow control for priority and QoS purposes. Because the majority of data traffic will bypass the bus and the operating system (OS) of the server (s), the reliability and throughput can be significantly improved. Therefore, for a given capacity of a server, much more data traffic can be handled, thus making the system more scalable.

BRIEF DESCRIPTION OF THE DRAWINGS

FIG. 1 is a top-level logical diagram for the data-driven multi-processor pipelined model.

FIG. 2. is a top-level hardware diagram for the data-driven multi-processor pipelined model.

FIG. 3 describes the software structure for the preferred embodiment for the data-driven multi-processor pipelined model.

FIG. 4 describes the data queues and processes in the preferred embodiment of the data- driven multi-processor pipelined model.

FIG. 5 describes the traffic detour to host for Method 2 for file system consistency between the bypass board and the host.

FIG. 6 describes the buffer cache relation with the file system and FS device driver.

FIG. 7 is the diagram of the TCP retransmission stack.

FIG. 8 is top-level diagram for the relation between the device and server and storage.

FIG. 9 is general function blocks inside the device with three logical interfaces, namely network, server and storage.

FIG. 10 gives an example of major detailed functions performed to achieve claimed improvements.

FIGS. 11 and 12 are flow charts for data flow from network to storage or vice-versa.

FIG. 13 is a depiction of information decoded in various layers of protocols.

FIG. 14 shows an example of the Expanded Routing Table (ERT) with assumed contents.

FIG. 15 is an example of pipelining process to maximize the performance.

DETAILED DESCRIPTION OF THE PREFERRED EMBODIMENTS

The preferred embodiment of the invention is illustrated in FIGS. 1–15, and described in the text that follows. Although the invention has been most specifically illustrated with particular preferred embodiments, it should be understood that the invention concerns the principles by which such embodiments may be constructed and operated, and is by no means limited to the specific configurations shown.

In one embodiment, a three-way network server bypass device has two main function blocks (100 and 101) as shown in FIG. 8. Based-on decoded high layer protocol information, the control unit, CU (100) decides to switch the data to the server or to the storage through switching element (SE, 101). The device may be physically inside the server housing, but may also be supplied as an external unit.

The present invention improves performance and reliability of network data access with the flexibility of a server-based system. It avoids multiple data-copying in a server system. The invention lets the majority of traffic bypass the server system bus, operating system (OS) and CPU or any other involvement with the server. It can also support quality of service (QoS) like prioritized traffic streams for real-time applications with video and audio, with bounded delay. Lastly, in a multiple-server system, it can provide load balancing and flow control combining with the CPU/bus/QS bypassing to optimize the overall system performance and improve fault-tolerance.

The above-mentioned improvements are achieved by decoding high-layer protocol(s) in real-time and using the information to direct the traffic flow between network interfaces, storage system (or SAN), and server(s), Depending on the nature of the application (in part or in whole), the traffic can be categorized as server-oriented, which will be sent to server system, or storage-oriented (data retrieving), which will be transferred between the network and storage directly without the servers (CPU, OS and Bus) involvement. As Internet and web applications become more prevalent, the resulting ever increasing traffic will tend to be storage-oriented. The invention dynamically identifies such traffic as storage-oriented and allows such traffic to bypass server (bus, OS and CPU).

The example application presented describes a single packet or a stream of packets with a particular purpose (e.g. user request for a web page.) Therefore, such a request-reply pair session may consist of several sub-applications. For instance, a user-initiated request may have to go through log-in and authorization processes that should be handled by server(s). This is a server-oriented process. But after a request is authorized, the transfer of data from the storage to the user can bypass the server and be sent directly to the user through the network interface; it is storage-oriented. Furthermore, the log-in and authorization can be a different type of application from the main session. For example, a request may not be real-time in nature, while the data transfer could be an isochronous video or audio stream like the case of "video-on-demand."

Simplified examples of application categorizing include:
1. Authorized real-time data transfer between a network interface and a storage interface.
2. Authorized non-real-time data transfer between a network interface and a storage interface.
3. Server-oriented traffic. For example, a new request to access a web page or user log-in from the network or storage system control between the server and storage system.
4. All other traffic defaults to the server (e.g., local traffic between server and storage).

Traffic types (1) and (2) will be routed to respective network or storage interfaces (e.g. from storage to network or vice-versa.) while (3) and (4) will be sent to server(s). The decoding process is to look into necessary protocol (layers) and to categorize incoming traffic (from where and for what). Then, the decoded header information (IP address, port ID, sequence number, etc.) is used as an index to the routing table for a match. A matched entry means the direct connection between network and storage has been "authorized."

Exemplary decoded header information is shown in FIG. 13. For example, the HTTP header is in the payload of TCP, which in turn is in the IP packet. The decoding process is to look into the HTTP headers for the nature of data (GET, POST, DELETE, etc, and maybe application payload length.)

The data content then is divided into segments of integral multiples of a fixed base, a process that we call "base-multiple segmentation" (BMS) technology. For example, a base of y bytes, say 2 Kbytes, is chosen, and all data streams or files are segmented into chunks of integral multiples of 2 Kbytes, like 2, 4, or 8 Kbytes (padding it for the last chunk if it is not an exact integral multiple of 2 Kbytes), with an upper limit of, say, 40 Kbytes (20 times y). The maximum size is chosen based-on the requirement of isochronous real-time traffic and the switching speed, such that it will still meet the tightest real-time needs while the switching element serves the largest segments. The advantages of BMS are that it is easier to pipeline multiple data streams or files yet still has the flexibility of variable segment size, which reduces overhead (in setup and headers) and improves performance of the device. The BMS technique described above can be used to advantage not only with the apparatus of the preferred embodiment, but in general data switching applications as well.

Once the nature of the traffic is determined, by consulting the Expanded Routing Table (ERT) (with more information than a regular routing table), as shown in FIG. 14, a proper switching path can be selected to forward the traffic with proper QoS measurement. For instance, higher priority traffic can be given more bandwidth and/or lower delay. The forwarded traffic to the network will then be processed with the proper protocol format conversion for transmission with all the necessary error checking and/or correction.

A synchronization scheme is employed to interlock the decoding and switching processes. Multiple incoming data streams are queued, for decoding and parsing (e.g. at application layer with HTTP) to decided which path to forward the data. Synchronization is necessary between different phases of a request-reply session. For example, a reply to a request from a network user must be forwarded to the user after the authorization (or log-in) process. While the server is running the authorization process, the storage data fetching can be handled concurrently to speed up the process. By the time a request is granted, the data may be ready or getting ready for transmission; otherwise, if it is denied, the transmission is aborted. These concurrently pipelined processes are illustrated in FIG. 15.

The invention uses a high-layer or cross-layered (cross protocol layers) switching architecture, because the traffic pattern is significantly influenced by the upper layer applications while the transport unit or packet format is mostly determined by the low layer protocols. For instance, web applications determine the size and nature of the transfer (e.g. text-only, still pictures and/or video clips) in the headers of application layer. Low layer protocols decide the size(s) of the packets at various network or system segments and the way to handle them (e.g. fixed size packet vs. variable size, packet size, delay tolerance and flow control methods such as window-based flow control). By using upper layer information to help direct the low layer storage data transport, the benefits can be significant. For example, for streaming applications, data transport is streamed instead of switched packet-by-packet, thus achieving higher through put).

In networking, end-to-end user experience depends on the network. bandwidth (transport), server response time and storage access time. Among these factors, server congestion and the associated cost to handle the ever-growing network traffic are the major concerns and uncertainties for delivering QoS. By doing real-time high layer protocol decoding and parsing, and switching the majority of traffic to bypass the server with delay bound, toe overall system performance and QoS can be improved greatly.

Functional Description of Main Components

Switching Element

The switching element provide s a data path for three-way switching (although it can have more than three physical connections) to and from the network, storage and server function units (CPU), through their respective interfaces with bounded delay. The switching element may be a fully-connected crossbar, memory-based switching, shared medium or other switching construct. The switching element has the capability of switching data traffic between any two (or more) of the interconnected interfaces. It is controlled by the control unit (CU) through a routing table that is set by server and on-board control based-on user request information.

Decoding and Control Unit (CU)

Decoding:

Based-on the targeted protocol layer(s), the decoding block(s) will look into parts of the packet payload to parse higher layer header and/or content information to be used in making routing decisions in real-time. The information will be compared with a routing table entry for a potential match. The purpose of using higher protocol layer information is to direct and optimize the traffic flow (throughput, utilization, delay, losses, etc.) for performance and reliability improvement. In FIG. 10, only, an HTTP/html application is given as an example. Other applications like ftp and RTSP/RTP can also be implemented.

Control:

Based on the decoded information and the routing table content, a control signal is sent to the switching element (SE). The SE will set up a circuitry moving the data or packet(s) to the proper outgoing interface(s) through the switching element. Data or packets can be moved either individually and/or in batch (streaming), depending on the relations among them. It also controls routing table update, format conversions (which format to use) and other housekeeping tasks.

Scheduler and Flow Control:

While multiple concurrent streams waiting to be routed, the scheduler decides the order of execution based-on the priority and QoS information in the routing table. Some flow control mechanisms can also be exercised for the network interface and/or storage interface for further improvement of performance.

Router:

The router keeps a routing table, switching status and history and certain statistics, and controls the path traversed by the packets. The content in the routing table is provided by the server, based on storage controller (or SAN interface), and/or decoded packet information.

The switching and routing elements may be of a predetermined latency, and the routing table may include routing information (which port to route), the priority, delay, sensitivity and nature of the applications, and other contents for QoS measurement.

Buffering, Format Conversion and Medium Interfaces

Buffering:

Basically, there are two kinds of buffers in the device. One is to buffer two asynchronized parts between the network, storage and server interfaces. The other serves as a waiting space for decoding higher layer protocols. In other words, the latter is to synchronize the decoding process and the switching process. The decoding time is pre-determined by design, so that the buffer size requirement can be calculated. A common pool of memory may be shared to save memory. This requires buffer management to dynamically allocate the memory for all pending threads/sessions.

Format Conversions:

There are several formats with respect to different interfaces and layers of protocols. These decodings and conversions have to be done in the device and involve multiple protocol layers. Examples of decoding and format conversions are HTTP, RTSP, ftp, IP/TCP/UDP, Ethernet, SCSI, Fibre Channel, and/or PCI interfaces.

Medium Interfaces:

In this description, there are three types of logical medium interfaces: the network, storage and server(s). In actual implementation, various physical interfaces are possible, e.g., multiple network interfaces or storage interfaces or multiple servers. Buffers are used to synchronize transmission between interfaces. An example of implementation may be Ethernet, ATM or SONET for network interface, SCSI, Fibre Channel, PCI, InfiniBand, or other system I/O technology.

There may also be a speed matching function between the network and storage, load balancing functions for servers, and flow control for priority and QoS purposes. Such speed matching function may be effectuated through buffering. Such load balancing may be executed between or among any homogeneous interfaces in the device, and is effected based on message exchange comprising feedback information from the targeted device or other means well known in the art.

Description/Example

FIG. 10 describes an implementation with Ethernet interface (310) for networking, PCI (340) for server and SCSI (350) for storage.

Storage to Network Traffic Bypass:

An incoming user/client request is received from Ethernet interface (310) and decoded at different layers from the Ethernet format (311) and IP/TCP (312) format. Then http header is parsed against the Expanded Routing Table residing in the Router (313, 314 and 315). If a match is found, the subsequent data (until the end of the http payload; perhaps an html file) will be forwarded per the router; otherwise, the http payload will be sent to the server for further processing (the default route). A routing table match indicates an established (authorized) connection. For example, if the data is sent to storage, it may be an authorized WRITE to the storage. The data routed to the server can either be an initial request for access or server-oriented traffic. The server may process the request with a log-in (if applicable) using an authentication, authorization, and accounting (AAA) process. The software on the server will communicate with the device for all necessary setup (e.g., routing table and file system for the storage) through the Router Control (316) and Scheduler (in 315) and then pass the control to the device and notify the storage to start a response to that request with a given file ID (or name) for the file system (351) through the control path. The file system (351) then can issue commands to SCSI Interface (350) to fetch the data. When the response data in html format comes back from storage, it will be correlated to an established connection in the ERT (315) for proper path (314). Then an http header will be added (322). TCP/IP protocol conversion is carried out on the device (321 and 320). Finally, the data will be packed in Ethernet packets and sent out through the Ethernet Interface (310). The transfer from the storage to the network through the device for this connection will continue until it is completed or the device is notified by the server or storage to stop sending under certain events (e.g., error or user jumping to another web page). A pool of memory is used to dynamically control the traffic and buffer asynchronous flows. Control Unit (300) coordinates all the activities. FIG. 12 shows the flow chart of the data flow.

Higher layer traffic information (e.g. HTTP or even html) is used to optimize the performance. For instance, a single initial web access request from the network is forwarded to the server. Once the server decides the access is legitimate, it sets up both the CU and storage control (or through the CU). Subsequent traffic (responses) will bypass the server and be directly forwarded to the network interface for further transfer. But a new request from a user will be directed to server for processing. This may include the case of accessing a new web page or area or from different applications (windows). Also, based on the nature of traffic (html vs. real-time video clip for example), differentiated services can be provided. Further, streaming based on the content can improve even non-real-time applications.

The default traffic path is through the server(s). For cases like initial user login, storage access error, or interrupted web page access, the server(s) would take over the control. Signaling is used to communicate between the server and the device. For the majority of data transfer, however, the server(s) is not in the data path so bus contention, OS involvement (interrupt) and CPU loading are significantly reduced. The traffic reduction through the server is very significant while the flexibility of having server(s) handling unusual cases is maintained in the design, as contrasted with the NAS approach.

Network to Storage Traffic Bypass:

The device is bi-directional. To write to storage, once granted access, the server sets up the router (315) mechanism and the subsequent incoming traffic from network for the same session will bypass the server through the decoding processes (310, 311, 312, and 313). The decoded high layer information is parsed against the routing table (in 315). Proper connection to either server or storage can then be established by the Switching Element (303). If it is through the server, the data will go through the server bus and the OS for proper processing. Otherwise, a direct connection will be set up to route data (say, html files) to storage through the file system (351) (to handle file format), drivers (to handle storage controller interface, e.g., SCSI) and storage controller. The traffic through server and through SE is synchronized by the Scheduler (31b) and Memory Pool (301) before it is sent to SCSI Interface (350). This process is shown in FIG. 11.

In both of the traffic directions, the storage and the network interfaces will carry out the proper protocol and format conversions with necessary buffering as shown in FIGS. 11 and 12.

Other Features:

Because the decoding time and switching time can be pre-determined, the delay for a packet going through the device is bounded. Further, for the same reason, the potential loss of packets can be reduced. A priority mechanism can be implemented to support different QoS requirements in the, Router and Scheduler (315 and 300). In the case of multiple servers and/or storage and network devices, a load balancing and flow control mechanism can be applied based-on application tasks.

The server's role is supervisory, and is not involved in the byte-by-byte transfer. The CPU, operating system and server bus(es) are not in the normal path of the data transfer in either direction (from network to storage or from storage to network.) This invention represents a change from interrupt-based server and OS to switching-based networking architecture.

Performance improvements provided by the invention include:

1. Higher throughput: a significant (or majority) portion of traffic will directly go through the switching device, so data throughput can be dramatically improved while the server bus and operating system (OS) are bypassed.
2. Less delay: the server and bus contention and OS interrupt handling are out of the data path, through the switching element.
3. Real-time applications: bounded latency guarantees real-time applications due to the switching nature of the design.
4. Better reliability: less traffic going through server means less potential for server caused packet loss and malfunctions (server crashes). With added traffic control mechanism in the device, a shield can be implemented to protect server(s) from overloading and potential malfunctions.
5. Flexibility and versatility: due to the architecture, the device is still very flexible by having server-oriented or computation intensive services immediately available to the applications, e.g. authorizing, security check, data mining, and data synchronization.
6. Priority of services: higher layer(s) information can be used to help to prioritize services in the device. Reduced server loading should further improve the QoS to high priority and regular traffic.
7. Scalability: multiple devices can be used within a single server or a single device among multiple servers to support large-scale applications.

The type of server(s), operating system(s), network(s), storage system(s) or the speeds of the networks are not essential to the invention. Various interfaces can be designed. The three-way switching is a logical concept. In an actual implementation, the system can involve multiple networks and/or storage networks, e.g. a four-way switching among an ATM, Ethernet and storage area network (SAN) interfaces. The basic idea is a high layer or cross-(protocol) layered switching mechanism among heterogeneous (network) systems with embedded real-time protocol conversion to bypass the server(s) as much as possible. In addition, if multiple servers are involved, a load balancing scheme can improve the overall system performance further.

Certain Improvements

The following additional definitions will be useful in discussing certain improvements in connection with the invention discussed above:

"Bypass Board": an enhancement board designed to reduce average CPU load when installed into an existing host server. It achieves this in two ways: (1) Reduction in the processing of specific traffic, and (2) Reduction in I/O bus transactions.

"TWIP (Three-Way Internet Port) Board": The preferred embodiment of the-Bypass Board. The TWIP Board (or simply referred to as TWIP) is a peripheral interface board that plugs into a PCI socket, replacing at least one existing SCSI disk controller and one NIC board. The host's existing hard drive is then plugged into the TWIP along with a 1 Gbit switched Ethernet connection. Host-side drivers that permit visibility of the SCSI disk and network connection from all existing applications will also accompany the TWIP board.

In this embodiment, the traffic to be bypassed is assumed to be HTTP traffic. However, other types of traffic (such as FTP, RTP and etc.) are possible. The FFP capability can be used, among other thing, to support an efficient backup of the storage device concurrent with, for example, production HTTP operation, thereby avoiding downtime dedicated to backup.

The drawings are described in detail below with respect to the five specific solutions strategies set forth above.

Throughput Improvement by the Data-Driven Multi-Processor Pipelined Model

The design of TWIP is based on a data-driven multi-processor pipelined model as shown in FIG. 1. In a data-driven multi-processor pipelined model, tasks are assigned to specific processors whose actions are triggered by the arrival of input data. Upon completion of the required processing, each processor puts the output data into the input queues of the processor for the next tasks to be performed on the output data. The operations of the processors are asynchronously executed and the processing of the data form multi-stage pipelines. The payload data are not copied or moved once they are loaded into the payload buffers until they are finally sent out. Each processor, along with the input/output queues, only operates on the labels associated with the payload data. The labels could be the pointers or headers of the payload data. All inter-processor communications involve labels but not the payload.

There are many advantages of this model. Among them is the savings in the label processing as compared to payload processing. For example, most Ethernet packets are of the size 1.5 KB at the most, the average header/pointer is 20 bytes; this would result in 75:1 ratio in bus and memory traffic, and a saving of 75 fold.

From the hardware perspective, this model is depicted in FIG. 2. As shown in FIG. 2, the payload data do not even go through any of the processors. The traffic between the payload buffers and the host can also involve labels if the application program (which could be modified) on the host does not need to process the payload data.

FIG. 3 shows the software structure for the TWIP preferred embodiment. The functional relationship among the software modules is described below.

The Network Interface Card (NIC, 701) receives data from the network. The NIC Device Driver (NIC DD, 702) fetches the data from the buffer on NIC (701). The NIC DD (702) checks to see if the traffic is non-HTTP (the traffic not to be handled by TWIP). If so (702) redirects the traffic to the Host (718) through Ethernet DD (704) using DMA (DMA1), else (702) directs the traffic to the TCP/IP processor (705) through packet descriptor module (703). The TCP/IP processor (705) passes HTTP payload labels to TWIP HTTP engine (707) through a socket (TCB Socket, 706). The TWIP HTTP engine (HTTP 707) parses the HTTP payload and decides to use one of the two file subsystems, (709 or 710) and then issues file system requests to (709) or (710) through the buffer cache (708).

Both file subsystems (tFS, 709) and (xFS, 710) request data from the buffer cache module (711). If the data is not cached in (711) and the request comes from subsystem tFS (709), (711) will ask the TWIP block device driver (tBlock DD, 712) to fetch the data. If the data is not cached in the buffer cache (711) and the request comes from subsystem xFS (710), (711) will ask another TWIP block device driver (xBlock DD, 714) to fetch the data.

The tBlock DD (712) asks tSCSI DD (713) to fetch data from the SCSI disk (716) using DMA5 and the xBlock DD (714) asks tVirtual DD (715) to fetch data from the virtual disk (719) from the host using DMA2.

Both the non-HTTP traffic host (718), which handles all non-HTTP traffic, and the virtual disk for the HTTP traffic (719), which handles all HTTP traffic that TWIP cannot handle, are on the server computer. The non-HTTP host consists of TWIP Host DD (722), Host TCP/IP engine (723) and Host non-HTTP application program (724). When a request is forwarded from the NIC DD (702), it is transferred to (722) by DMAL. The TWIP host DD I (722) communicates with a network protocol, assumed to be TCP/IP (723), to provide services for the non-HTTP application (724).

The Virtual Disk (719) simulates a virtual disk to TWIP and it handles the HTTP traffic that cannot be handled by TWIP. The virtual disk (719) consists of TWIP Host DD II (725), t-protocol engine (726), and the Host HTTP application program, assumed to be Apache, (727). The Virtual Disk (719) serves as a disk to TWIP for dynamic web content. The HTTP application program (727) is used to generate the dynamic web content data. Once the data is generated, t-protocol (726) will create a virtual disk environment for xFS (710) so that (710) may load the dynamic web content data for different requests as files from the virtual disk (719).

When an application, including both non-HTTP and HTUP programs, needs to access the SCSI disk, it asks the Host File System (721) and the Host SCSI DD (720) to complete the disk access request.

The following are the definitions of all of the items listed in FIG. 3 for clarification.

- NIC (701)—Network Interface Card is a piece of hardware that is used by the server to communicate to the network.
- NIC DD (702)—Network Interface Card Device Driver is a piece of software that knows how to interact with NIC (701) to obtain data from the network and to send data to the network.
- Packet Descriptor (703)—Packet Descriptor Module is used to provide data structures and interfaces for TCP/IP (705) and NIC DD (702) for them-to communicate.
- Ethernet DD (704)—Ethernet Device Driver is used to forward Ethernet packets to the host when the Ethernet packets are used by non-HTTP application.
- TCP/IP (705)—On board TCP/IP is used to handle all HTTP related TCP/IP traffics.
- TCBSocket (706)—TCBSocket is a communication gateway between TCP/IP (705) and tHTTP (707).
- THTTP (707)—THTTP is an on board HTTP protocol. THTTP consists of simple HTTP functions in order to process simple HTTP requests.
- FSRequest (708)—FSRequest modules provides data structures and interfaces for tHTTP to communicate with the file system module (709 and 710).
- TFS (709)—TFS is a file system that understands the file system format that was used to partition the SCSI disk (716). (e.g. EXT2, NTFS)
- XFS (710)—XFS is a file system that understands the virtual file system format on the Virtual Disk (719).
- Buffer Cache (711)—Buffer Cache helps lowering down the disk access by provide caching algorithm.
- TBlock DD (712)—TBlock Device Driver is one part of the block device driver used to encapsulate the underlying SCSI device drivers (713).
- TSCSI DD (713)—TSCSI Device Driver will retrieve data from the SCSI Disk (716) and present to TBlock Device Driver (712) in the format of "Block" defined by block device driver.
- XBlock DD (714)—XBlock Device Driver is one part of the block device driver used to encapsulate the underlying Virtual disk device drivers (715).
- TVirtual DD (715)—TVirtual Device Driver will retrieve data from the Virtual Disk (719) and present to XBlock Device Driver (714) in the format of "Block" defined by block device driver.
- SCSI Disk (716)—SCSI Disk contains data for the web server.

TSCSI DD to Host (717)—TSCSI Device Driver to Host is used to provide a tunnel for the OS SCSI DD (720) to access tSCSI DD (713) to retrieve data from SCSI Disk (716).

Host for non-HTTP traffic (718)—This is an abstraction on the host that consists of TWIP Host DD I (722), TCP/IP (723) and non-HTTP Application (724). This abstraction represents the processing of non-HTTP traffics from the network. (NOTE: any non-HTTP traffics including the ones that does not use TCP/IP) The middle layer protocol (723) may change depending on the application, but the idea should be similar.

Virtual Disk (719)—Virtual Disk is an abstraction that consists of TWIP Host DD II (725), t-protocol (726) and HTTP Application (727). This abstraction provides TWIP a "virtual disk" so that for all HTTP traffic, including the ones that TWIP can handle or not, will be treated as if they can be handled. Each request that is forwarded to the host is a "file" in "virtual disk". The content of the file is created on the fly and will be presented to TWIP as if the file is a static file.

OS SCSI DD (720)—OS SCSI Device Driver is used to provide the interfaces to the server FS (721) for SCSI disk access for the server computer.

FS (721)—This File System is on the server computer and is defined by the OS that the server is running with.

TWIP Host DD I (722)—TWIP Host Device Driver I is used to control the data transfer using DMA between TWIP NIC Device Driver (702) and Server TCP/IP (723).

TCP/IP (723)—The host TCP/IP is used only for non-HTTP Applications.

Non-HTTP Application (724)—Any application protocols that is not Hypertext Transfer Protocol. (e.g. FTP, Telnet)

TWIP Host DD II (725)—TWIP Host Device Driver II is used to control the data transfer using DMA between tVirtual DD (715) and t-protocol (726).

t-Protocol (726)—t-Protocol is used to intercept the data from HTTP applications (727) to TCP/IP so that these data can be send out to the network using TWIP TCP/IP (705).

HTTP Application (727)—Any application protocols that is Hypertext Transfer Protocol. (e.g. Apache)

From the perspective of queues and processes, the TWIP operations are depicted in FIG. 4. A brief description of this queue-and-process architecture is provided below.

The NIC Device Driver processor (802) constantly grabs packets from the Network Interface Card's receiving buffer (801). The NIC DD processor (802) first makes sure that the packet is a fragmented IP packet. If so, (802) will put the packet in the IP receiving queue (806) that will be handled by the TCP/IP processor (807) on TWIP. If the packet is not fragmented, the NIC DD processor (802) will determine if the packet is an HTTP packet. If so, (802) puts it in the IP receiving queue (806), else (802) puts the packet in the queue (803) that will be transferred to the server through Ethernet Device Driver (840).

TWIP TCP/IP processor (807) constantly grabs packets from (806) to process. After processing the packet (e.g. de-fragmentation), (807) can determine if the packet belongs to HTTP traffic.

For non-HTTP traffic, (807) will forward the packet to the server by putting it in the IP Forward queue (808). The t-Eth Device Driver (840) then combines the packets in IP Forward queue (808) and the packets in the queue (803) and then put the packets in Queue X (841). For HTTP traffic, (807) will hand the HTTP payload portion of the packet to tHTTP (813) through TCB receiving queue (811). As we can see, the traffic has been divided into two paths: non-HTTP and HTTP traffic.

For the non-HTTP path, The Ethernet Device Driver module DMA the data over to the receiving ring (851) on the server. The TCP/IP (853) on the server will process the packet in the receiving ring (851) and present the application layer data to the non-HTTP applications (854). Normally these non-HTTP applications (854) will issue file system calls. If so, the file system processor (856) will communicate with the OS SCSI device driver processor (866) on the server to obtain data from the SCSI Disk (831).

The OS SCSI device driver (866) must communicate with TWIP's device driver (tFS DD, 829) to obtain data from the SCSI Disk (831). To do so, (866) forwards the requests issued by the server file system (856) to the on board queue (835). using DMA (834). TFS device driver (829) will read requests from the queue (835) and access the SCSI Disk (831) to retrieve data from the disk. tFS device driver processor (830) will then take the data from the disk and put it in the queue (832) which will be DMA (833) over to the server queue (867). The server SCSI device driver (865) already anticipates for the data to come back in queue (867). Once the data comes back, (865) wakes up the processors that are waiting for this piece of data, which is the file system processor (857). Finally, (854) will obtain data from the file system processor (857) and then send it to the network using the server TCP/IP protocol (852). The server TCP/IP protocol (852) puts-the data in the transmission ring (850). The data in the ring (850) will then be forwarded by DMA over to TWIP in Queue Y (844). Once the data is ready in the queue (844), the NIC Device Driver processor (804) will take the data in the queue (844) and put it into the NIC transmission Queue (805), which is then sent out to the network.

The other path is the HTTP path. For the HTTP path, the tHTTP processor (813) will grab the HTTP payload that was put in TCB transmission queue by TWIP TCP/IP processor (807). The tHTTP processor (813) will process this payload and determine if HTTP request data can be found on SCSI Disk (831) or Virtual Disk. If on SCSI disk, tHTTP processor (813) will use tFS (821) otherwise it will use xFS (819). Once again, xFS (819) is a file system processor that will understand the format of a Virtual Disk, which is an abstraction for handling dynamic content requests. This abstraction provides tHTTP processor (813) an effect as if tHTTP always deals with static content requests.

To obtain data from SCSI Disk (831), tHTTP (813) must issue file system requests to file system request queue (816) because tFS processor (821) will continue to look for requests to process from the queue (816). Once (821) processes the file system request, it will try to access the disk through buffer cache. Buffer cache gives tFS (822) the buffer handler to the area that the requested data will be positioned in the memory when comes from the disk. If the requested data is not in the buffer cache, then buffer cache will queue up in (825) where the request will be processed by tFS device driver processor (829). When the data comes back from the SCSI Disk (831), the tFS device driver (830) will put the data in the location (826) that was associated with the buffer handler. Finally, tFS (822) will notify, through the queue (818), tHTTP processor (814) that the data is ready.

If tHTTP (813) needs to obtain data from Virtual Disk, it must also go through buffer cache (823) as described in the case of tFS (821) to communicate with the device driver (xFS DD, 827). The xFS device driver (827) will look for request in the queue (823). When xFS device driver (828) retrieves data from Virtual Disk, it puts the data in the location (824) that is associated with buffer handler. Finally xFS (820) will notify, through the queue (817), tHTTP processor (814) that the data is ready.

THTTP (814) will put the data coming from both (818) and (817) on the TCB transmission queue (812), which will be taken by TWIP TCP/IP (809) and processed into a packet. (809) will put the packet in the IP transmission queue which is then transferred to the network through NIC device driver (804) and NIC transmission queue (805).

In the Virtual Disk, xFS device driver (827) issues request through the queue (862) to T-Protocol (860). T-Protocol processor (861) provides data structures that make xFS (820) behave as if it is interacting with a disk. The server HTTP application (864) will process the request from queue (862) and create HTTP payload that is presented as the data of a static file from Virtual Disk. The data is then put on the queue (863). The detail of how HTTP Application (864) uses the file system (856) parallels the prior discussion of how the non-HTTP Application accesses the file system (856).

The following are the definitions of all of the items listed in FIG. 4 for clarification.

- NIC DD (802), (804)—This is a Network Interface Device Driver processor for receiving (802) and transmitting (804).
- NIC Tx Queue (805)/Rx Queue (801)—This is the NIC queue for transmitting (805) and receiving (801).
- (803)—This is a queue that holds the non-HTTP traffic that is determined by NIC DD (802).
- TCP/IP (809), (807)—TWIP TCP/IP for transmitting (809) and receiving (807).
- IP Tx Queue (810)/Rx Queue (806)—This is the IP queue for transmitting (810) and receiving (801).
- IP Fw Queue (808)—This is the forward queue for non-HTTP traffic that is determined by TCP/IP (807).
- TCB Tx Queue (812)/Rx Queue (811)—This is the socket queue for transmitting (812) and receiving (811). This is the communication portal between tHTTP module and TCP/IP module.
- THTTP (814), (813)—TWIP HTTP processor for transmitting (814) and receiving (813).
- Fs request queue (816), (818)—file system request queues for tFS, both transmitting (816) and receiving (818).
- Fs request queue (817), (819)—file system request queues for xFS, both transmitting (817) and receiving (815).
- TFS (821), (822)—tFS is the file system processors that understands the file system format on SCSI Disk (831), both transmitting (822) and receiving (821).
- XFS (820), (819)—xFS is the file system processors that understands the file system format on Virtual Disk, both transmitting (819) and receiving (820).
- (825), (826)—Transmitting queue (825) and receiving queue (826) are used for the device driver request to retrieve data from SCSI Disk (831).
- (824), (823)—Transmitting queue (823) and receiving queue (824) are used for the device driver request to retrieve data from Virtual Disk.
- tFS DD (829), (830)—tFS device driver processors, transmitting (829) and receiving (830), that is used to retrieve data from SCSI Disk.
- xFS DD (828), (827)—xFS device driver processors, transmitting (828) and receiving (827), that is used to retrieve data from Virtual Disk.
- SCSI Disk (831)—SCSI Disk that is formatted using the format that is supported by tFS. (e.g. EXT2, NTFS).
- (835), (832)—Transmitting queue (832) and receiving queue (835) are used to store the file system request from the OS SCSI device driver processor (866).
- DMA X (834) (842), DMA Y (833) (843)—These four DMA processor uses the DMA channels to transfer data between TWIP and the server.
- Queue X (841)—This queue is used to queue up all non-HTTP requests from the network.
- t-ETH DD—t-Eth device driver processor grabs data from IP Fw queue (808) and (803) and put it into one queue (841).
- Queue Y (844)—This queue is used to store all the data from the host that needs to be send out as Ethernet packets.
- Rx Ring (851) and Tx Ring (850)—These are the queues that stores both the transmitting packet and receiving packet that are non-HTTP from the networks.
- TCP/IP (853), (852)—These are the transmitting (852) and receiving (853) host TCP/IP processors.
- Non-HTTP Application (854)—Any application protocols that is not Hypertext Transfer Protocol. (e.g. FTP, Telnet).
- Other App (855)—This is used as an example that there are other applications other than the HTTP application and non-HTTP application that uses file system (856). Someone who access through the terminal may start these applications.
- FS (856), (857)—These are the receiving (856) and transmitting (857) file system processors on the server.
- T-Protocol (861), (860)—These are the receiving (860) and transmitting (861) t-protocol processors that is used to communicate with the HTTP Application (864) to obtain return payload and then provides xFS (820) with an virtual file system.
- (863), (862)—These two queue are used for store transmitting (863) and receiving (862) data between host and TWIP.
- HTTP Application (864)—Any application protocols that is Hypertext Transfer Protocol. (e.g. Apache)
- SCSI device driver (865) and (866)—These two SCSI device driver processors, receiving (866) and transmitting (865) are used to issue SCSI request to TWIP file system device driver in order to complete the request from the host file system (856).
- (868), (867)—These two are the queues that transfer SCSI disk commands and SCSI disk data between host and TWIP.

File System Consistency Between the Bypass Board and the Host

A TWIP file system data consistency problem arises when TWIP issues a read to storage before or after the host initiates a write to the same file. This could lead to inconsistent data fetched by TWIP. Fundamentally this is caused by dual storage accesses without synchronization.

There are two solutions to the problem. To reduce overhead and unnecessary inter-locking, this method could be applied only when large files are being read.

In the first method, TWIP sends the filename to the host before TWIP Http engine issues a file read. The host TWIP device driver generates a fake fileopen(Filename) to block any potential host write to the same file. Then the host TWIP device driver sends a write_block_ack back signal back to TWIP. If on the other hand, the host fails to open the file for read, meaning that the host may be writing to the same file and TWIP read request should be held back, no write_block_ack back is to be issued, and the process should retry to open the file later. Once TWIP receives the write_block_ack, TWIP starts reading the file. When TWIP finishes the read, it sends the signal write_block_clear to the host, and the host TWIP device driver then does a fileclose(Filename).

This method relies on the host OS to enforce file (storage) access synchronization. It works much the same way all applications run on the host—they have to register with the host OS before proceeding. The registration process, however, can be pipelined. Once a file read request is sent to the host, the TWIP file system does not have to wait for response. It can proceed to process the next connection. After the host acknowledges the request (registration), the TWIP file system will go back to read the file.

In the second method, the host write request is intercepted by the TWIP host device driver. The TWIP host device driver then generates a write request (w_req). Then TWIP completes all outstanding read requests and sends back a write acknowledgement (w_ack) to the host and routes all future read requests to the host. Upon receiving the signal w_ack at the host, the TWIP host device driver releases the hold on the original write requests and proceeds to write (thick vertical line on host in FIG. 5). Once the host finishes all outstanding write operations, the TWIP device driver detects this and sends write-release (w_rel) to TWIP. When TWIP receives w_rel, it resumes the bypass function if it can handle the new incoming requests.

One disadvantage of this approach is that a write blocks any read from TWIP no matter if the write is targeting at a current read or not (global blocking). One advantage of this approach is that it is transparent to clients and graceful transfers the traffic from TWIP to host. The global blocking may not be significant if host write does not happen often.

HTTP Synchronization Between the Bypass Board and the Host

The bypass board creates a second data path to concurrently and asynchronously handle HTTP traffic, within a single TCP connection. This may cause the data arriving at the client within the same connection to be out of order.

There exist many ways to solve the problem. The solution approach described here assumes that no modification of the host HTTP application program on the host is allowed. A key to the problem is to find the end of the response economically (in term of computation power). An obvious solution is to parse the responses to match HTTP request lengths against the HUrP size fields. This solution may work in some scenarios but it is likely to be very costly due the parsing process (for every byte of data). Further, in some cases the size field of HTTP file may not be available.

The following is a method to quickly signal the end of an HTTP response.
1. A table keeping track of all outstanding requests within a connection is set up.
2. If a request to the host HTTP server is followed by a request through TWIP (bypass) according to the table, TWIP inserts a fake request (or a trace command) to the host HTTP server.
3. After the host HTRP server processes the first request, it responses to the second (fake) request without accessing the storage (e.g., a trace command) and produces a given pattern signal.
4. The arrival of the given pattern signals the end of the response for the original request.
5. TWIP then releases the response from bypass operation.

Since TWIP has the control over the pattern to catch, a hardware assisted parsing can be implemented to further speed the process.

Caching on the Bypass Board

Caching is useful to speed up data access for frequently accessed files. TWIP will come with a buffer cache (711). The cache effect is achieved by maintaining a usage table. When a file is loaded into the data memory, it is also logged in the usage table with a time stamp. The time stamp is updated every time a file is used. When memory is nearly full, the table is searched to delete those files which have not been used for longest time first by comparing the time stamps.

FIG. 6 depicts the relationship among the buffer cache, the TWIP file system, and the TWIP file system device driver.

The buffer cache allocates buffer pages for blocks of data on the disk. Each page corresponds to a block on the disk. After the buffer cache allocates the memory, it associates this memory space with a buffer handler. This buffer handler serves as a key to the file system for accessing the data.

Given a block number and a device ID, the buffer cache locates the associated buffer handler. If the file system request a data that already exists in the buffer cache, the buffer cache will return a buffer handler that is associated with the existing buffer page without accessing the disk. If the data does not exist in the buffer cache, the buffer cache will allocate a free buffer page according to an optimized algorithm. The free buffer page is associated with the request block number and the device id using the buffer handler. A request to the file system device driver will be issued to retrieve data from the disk to the buffer page. Finally, the associated buffer handler will be passed to the file system.

Storage-Based TCP Retransmission on the Bypass Board

The following discussion concerns storage-based TCP retransmission, meaning that the retransmission uses storage as the buffer for the transmitted data yet to be acknowledged. This kind of retransmission scheme is especially useful for high-speed WAN situations where the requirement for retransmission buffer size is huge, causing in-memory buffering to be unpractical.

TCP Retransmission Layer

In general, there are three approaches to the retransmission problem as the following:
1. The whole packet is kept in the memory.
2. The whole packet is removed from the memory and instead enough information is stored in the memory to recover the packet.
3. Only a part of the packet is in the memory and the rest is removed. Enough information is stored in the memory to recover the removed part of the packet.

Current TCP/IP stacks use approach (1). This patent proposes two new methodologies based on approaches (2) and (3).

Approach 2: Removing the whole packet

In general, in order to retransmit a packet two types of information are needed: (a) information about the file that the packet is transmitting and (b) information about the packet itself. This information can be saved on a per-packet basis within a connection.

Information about the file that needs to be retransmitted can consist of an ID label that uniquely identifies the file (e.g. in a Linux platform the inode ID would be a good candidate). Also, the offset within the file can be saved. This offset could be derived from the sequence number of the packet to be retransmitted.

Information about the packet should include those header fields that are supposed to be dynamic on a per-packet basis within a connection. For example, it is not mandatory to keep information about the IP addresses for the packet since this information does not change within the packets belonging to the same connection. Instead, this information can be retrieved from the connection structure when rebuilding the packet.

Approach 3: Removing some parts of the packet

A packet consists of different parts. Because reconstruction of some parts may be easier than others, a hybrid approach where not the whole packet is removed from memory could be useful. In general, the preferred parts to be removed are those parts of the packet that occupy a large amount of memory and that at the same time are easy to reconstruct.

This approach intents to maximize the ratio [memory freed per packet]/[complexity of packet reconstruction]. As the headers occupy a small percentage of the packet (usually <10 %) and require a bigger effort for their reconstruction, in this approach the headers are kept in memory. As the body of a file that is transmitted in the packets occupies a big percentage of the packets and requires relatively small effort for its reconstruction, the payload (the file body) is removed. Therefore, this approach keeps two types of data:

(a) Information about the file that needs to be recovered. This can consist of an ID label that uniquely identifies the file (e.g. in a Linux platform the inode ID would be a good candidate). Also, the offset within the file can be saved. This offset could be derived from the sequence number of the packet to be retransmitted.

(b) The headers of the packets.

In order to maintain the layering properties of the TCP/IP stack, the proposed TCP retransmission scheme can be implemented adding an extra layer to the stack. The actual code in this case is not inserted in the same TCP module but as an extra module. This approach requires the definition of interfaces between [retransmission layer]-[TCP] and [retransmission layer]-[File System]. The protocol stack is depicted in FIG. 7.

The data consistency problem can also arise for the TCP retransmission scheme. If the data to be retransmitted is modified by the host while waiting to be retransmitted, inconsistent contents will result at the client site.

A simple solution is to make an image copy of the entire file on a swap file on the hard disk, when it is first open for transmission. In order to reduce overhead, only large files greater than a specific threshold will be copied. If the file is requested to be retransmitted in part, the image copy on the swap file is to be used, solving the inconsistency problem.

It is apparent from the foregoing that the present invention achieves the specified objectives of higher levels of RAS and throughput between the network and storage system, while retaining the security, flexibility, and services normally associated with server-based systems, as well as the other objectives outlined herein. While the currently preferred embodiment of the invention has been described in detail, it will be apparent to those skilled in the art that the principles of the invention are readily adaptable to implementations, system configurations and protocols other than those mentioned herein without departing from the scope and spirit of the invention, as defined in the following claims.

We claim:

1. An apparatus for interconnecting at least one data network, at least one storage device, and at least one server, comprising:

a) a network interface;
b) a storage interface;
c) a server interface;
d) a routing element having a routing table; and
e) a high-level protocol decoding unit, wherein decoded high layer application information is used by said control unit to direct and control traffic received from a data network in real time;

wherein said apparatus can transfer data between any two of said at least one data network, said at least one storage device and said at least one server;

wherein said routing table comprises information from the group comprising port to route mapping, priority, delay sensitivity, nature of the applications, or information for Quality of Service measurement;

wherein said at least one server may be bypassed in serving data to or receiving it from said network, further comprising a control unit, which routes data coming into (or being served from) said network either to (or from) said at least one storage device or to (or from) said at least one server; and multiple processors operating on pipelined data, wherein each processor is driven by the arrival of data.

2. An apparatus for interconnecting at least one data network, at least one storage device, and at least one server, comprising:

a) a network interface;
b) a storage interface;
c) a server interface;
d) a routing element having a routing table; and
e) a high-level protocol decoding unit, wherein decoded high layer application information is used by said control unit to direct and control traffic received from a data network in real time;

wherein said apparatus can transfer data between any two of said at least one data network, said at least one storage device and said at least one server;

wherein said routing table comprises information from the group comprising port to route mapping, priority, delay sensitivity, nature of the applications, or information for Quality of Service measurement;

wherein said at least one server may be bypassed in serving data to or receiving it from said network, further comprising a control unit, which routes data coming into (or being served from) said network either to (or from) said at least one storage device or to (or from) said at least one server; and means to provide file system consistency between said apparatus and said at least one server.

3. An apparatus for interconnecting at least one data network, at least one storage device, and at least one server, comprising:

a) a network interface;
b) a storage interface;
c) a server interface;
d) a routing element having a routing table; and
e) a high-level protocol decoding unit, wherein decoded high layer application information is used by said control unit to direct and control traffic received from a data network in real time;

wherein said apparatus can transfer data between any two of said at least one data network, said at least one storage device and said at least one server;

wherein said routing table comprises information from the group comprising port to route mapping, priority, delay sensitivity, nature of the applications, or information for Quality of Service measurement;

wherein said at least one server may be bypassed in serving data to or receiving it from said network, further comprising a control unit, which routes data coming into (or being served from) said network either to (or from) said at least one storage device or to (or from) said at least one server; and means for providing HTTP synchronization between said apparatus and said at least one server.

4. An apparatus for interconnecting at least one data network, at least one storage device, and at least one server, comprising:
 a) a network interface;
 b) a storage interface;
 c) a server interface;
 d) a routing element having a routing table;
 e) a high-level protocol decoding unit, wherein decoded high layer application information is used by said control unit to direct and control traffic received from a data network in real time;
 f) said a data cache to hold data from said storage device;
 wherein said apparatus can transfer data between any two of said at least one data network, said at least one storage device and said at least one server;
 wherein said routing table comprises information from the group comprising port to route mapping, priority, delay sensitivity, nature of the applications, or information for Quality of Service measurement; and
 wherein said at least one server may be bypassed in serving data to or receiving it from said network, further comprising a control unit, which routes data coming into (or being served from) said network either to (or from) said at least one storage device or to (or from) said at least one server.

5. An apparatus for interconnecting at least one data network, at least one storage device, and at least one server, comprising:
 a) a network interface;
 b) a storage interface;
 c) a server interface;
 d) a routing element having a routing table; and
 e) a high-level protocol decoding unit, wherein decoded high layer application information is used by said control unit to direct and control traffic received from a data network in real time;
 wherein said apparatus can transfer data between any two of said at least one data network, said at least one storage device and said at least one server;
 wherein said routing table comprises information from the group comprising port to route mapping, priority, delay sensitivity, nature of the applications, or information for Quality of Service measurement;
 wherein said at least one server may be bypassed in serving data to or receiving it from said network, further comprising a control unit, which routes data coming into (or being served from) said network either to (or from) said at least one storage device or to (or from) said at least one server; and
 means for using the storage device to hold data required for TCP retransmission.

6. A method of using the apparatus of claim 5 in connection with the protocol in order to perform a backup of said storage device.

7. An apparatus for interconnecting at least one data network, at least one storage device, and at least one server, comprising:
 a) a network interface;
 b) a storage interface;
 c) a server interface;
 d) a routing element having a routing table; and
 e) a high-level protocol decoding unit, wherein decoded high layer application information is used by said control unit to direct and control traffic received from a data network in real time;
 wherein said apparatus can transfer data between any two of said at least one data a network, said at least one storage device and said at least one server;
 wherein said routing table comprises information from the group comprising port to route mapping, priority, delay sensitivity, nature of the applications, or information for Quality of Service measurement;
 wherein said at least one server may be bypassed in serving data to or receiving it from said network, further comprising a control unit, which routes data coming into (or being served from) said network either to (or from) said at least one storage device or to (or from) said at least one server; and
 a file system consistency manager configured to provide file system consistency between said apparatus and said at least one server.

8. An apparatus for interconnecting at least one data network, at least one storage device, and at least one server, comprising:
 a) a network interface;
 b) a storage interface;
 c) a server interface;
 d) a routing element having a routing table; and
 e) a high-level protocol decoding unit, wherein decoded high layer application information is used by said control unit to direct and control traffic received from a data network in real time;
 wherein said apparatus can transfer data between any two of said at least one data network, said at least one storage device and said at least one server;
 wherein said routing table comprises information from the group comprising port to route mapping, priority, delay sensitivity, nature of the applications, or information for Quality of Service measurement;
 wherein said at least one server may be bypassed in serving data to or receiving it from said network, further comprising a control unit, which routes data coming into (or being served from) said network either to (or from) said at least one storage device or to (or from) said at least one server; and
 an HTTP synchronization manager configured to provide HTTP synchronization between said apparatus and said at least one server.

9. An apparatus for interconnecting at least one data network, at least one storage device, and at least one server, comprising:
 a) a network interface;
 b) a storage interface;
 c) a server interface;
 d) a routing element having a routing table; and
 e) a high-level protocol decoding unit, wherein decoded high layer application information is used by said control unit to direct and control traffic received from a data network in real time;

wherein said apparatus can transfer data between any two of said at least one data network, said at least one storage device and said at least one server;

wherein said routing table comprises information from the group comprising port to route mapping, priority, delay sensitivity, nature of the applications, or information for Quality of Service measurement;

wherein said at least one server may be bypassed in serving data to or receiving it from said network, further comprising a control unit, which routes data coming into (or being served from) said network either to (or from) said at least one storage device or to (or from) said at least one server; and a TCP retransmission data manager, wherein the TCP retransmission data manager is configured to use the storage device to hold data for TCP retransmission.

* * * * *